United States Patent [19]

Centofanti

[11] 3,972,982

[45] Aug. 3, 1976

[54] PROCESS FOR REMOVING FLUORINE COMPOUNDS FROM PHOSPHORIC ACID

[75] Inventor: Louis F. Centofanti, Webster Groves, Mo.

[73] Assignee: Monsanto Company, St. Louis, Mo.

[22] Filed: Mar. 3, 1975

[21] Appl. No.: 554,810

[52] U.S. Cl.............................. 423/321 S; 423/488
[51] Int. Cl.². ........................................ C01B 25/16
[58] Field of Search......... 423/321 S, 305, 307–313, 423/488, 658.5, 321

[56] References Cited
UNITED STATES PATENTS
3,367,749   2/1968   Koerner et al...................... 423/321

OTHER PUBLICATIONS

Bock et al., Fresenius' Z. Anal. Chem., 230 (3), 161–184 (1967).

*Primary Examiner*—Oscar R. Vertiz
*Assistant Examiner*—Gregory A. Heller
*Attorney, Agent, or Firm*—N. E. Willis; J. E. Maurer; T. N. Wallin

[57] ABSTRACT

Fluorine compounds are removed from aqueous phosphoric acid by extraction with a mixture of a silane and a long-chain hydrocarbyl amine.

4 Claims, No Drawings

PROCESS FOR REMOVING FLUORINE COMPOUNDS FROM PHOSPHORIC ACID

BACKGROUND OF THE INVENTION

This invention relates to a process for removing fluorine from aqueous phosphoric acid.

It is known that wet-process phosphoric acid obtained by acidulation of phosphate rock contains substantial amounts of fluorine, predominantly in the form of fluorine compounds such as fluorophosphates and various metal fluorides. Even following purification by known extraction processes, for example, extraction with various organic amines, ethers, etc., such phosphoric acid generally remains contaminated with undesirably high quantities of fluorine compounds with fluorine contents of 1,000 parts per million (ppm) by weight or more not being uncommon.

Fluorine contents of this magnitude introduce complications relative to the use of the acid in various applications. For example, if the acid is to be converted into alkali metal polyphosphates by neutralization and calcination, fluorine will be released in the calcination step and it may be necessary to provide expensive fluorine recovery steps to preclude release of undesirably large amounts of fluorine into the atmosphere.

It is known that fluorine compounds can be extracted from aqueous phosphoric acid containing the same by use of organic silanes [See Bock et al., Fresenius' Z. Anal. Chem. 230 (3), 161–84 (1967)]; however, lower molecular weight silanes such as triethyl silanol, diethyl silane diol, etc. cannot be economically separated from the fluorine compounds for reuse in the extraction process. When such low molecular weight silanes are contacted with basic solutions to neutralize and separate the fluorine compounds, the silanes tend to dissolve or polymerize in such basic solutions to an undesirably high degree. Higher molecular weight silanes have been found not to reduce the fluorine compound content of phosphoric acid to desirably low levels.

It is apparent therefore that practical methods for removing fluorine compounds from phosphoric acid are needed in the art.

SUMMARY OF THE INVENTION

It is an object of the present invention to provide methods for removing fluorine compounds from aqueous phosphoric acid. Particularly, it is an object of the invention to provide methods suitable for reducing fluorine content of phosphoric acid to levels of 300 parts per million or lower. These objects are obtained by extracting aqueous phosphoric acid containing fluorine compounds with a mixture of silanes and amines as hereinafter described.

The practice of the invention will be understood from the following description of the preferred embodiments.

DESCRIPTION OF THE PREFERRED EMBODIMENTS

The process of this invention can be effectively employed to remove fluorine compounds from any aqueous phosphoric acid containing the same. However, the process is most desirably employed to treat wet-process phosphoric acid which has been previously treated, for example, by hitherto known solvent extraction processes, to remove a major portion of the organic and inorganic impurities contained therein.

In accordance with this invention, fluorine compounds are extracted from the phosphoric acid with an extractant comprising a mixture of a silane and an amine compound.

The silane utilized in the extractant is represented by the formula

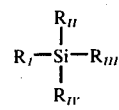

In the above formula, one or two of the $R_I$, $R_{II}$, $R_{III}$ and $R_{IV}$ groups are —OH, —Cl or —OR (R being an alkyl group containing from 1 to 4 carbon atoms). The remaining $R_I$, $R_{II}$, $R_{III}$ and $R_{IV}$ groups, in combination, contain a total of from 12 to 25 carbon atoms and are each alkyl, phenyl or alkyl phenyl groups. The limitation that such alkyl, phenyl, or alkyl phenyl groups, in combination, contain a total of from 12 to 25 carbon atoms is critical. If the carbon atom content is lower, the silane will be too unstable in aqueous base to be readily separated from the fluorine compounds which it extracts. If the carbon atom content is higher, extraction of fluorine compounds is undesirably inefficient.

Examples of silane suitable for use in the present invention are tri-n-butyl silanol, tri-n-hexyl silanol, tri-n-pentyl silanol, tri-n-heptyl silanol, tri-n-octyl silanol, tri-phenyl silanol, di-n-octyl disilanol, methyl diphenyl silanol, octadecyl phenyl disilanol, octadecyl methyl disilanol, octadecyl dimethyl silanol, dodecyl phenyl disilanol, phenyl dibutyl silanol, phenyl dihexyl silanol, phenyl dioctyl silanol, phenyl methyl hexyl silanol, phenyl methyl octyl silanol, diphenyl methyl, ethyl, propyl, butyl, hexyl or octyl silanol, etc.

Silanes which are particularly preferred from the standpoint of process efficiency and extractant recoverability are those represented by the formula

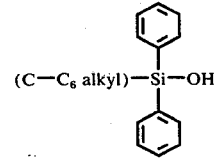

for example methyl diphenyl silanol, ethyl diphenyl silanol, butyl diphenyl silanol, etc.,

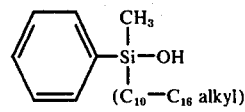

for example phenyl methyl dodecyl silanol, phenyl methyl decyl silanol, etc.,

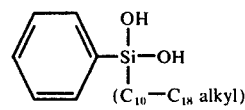

for example phenyl dodecyl disilanol, phenyl pentadecyl disilanol, phenyl oct-n-decyl disilanol, etc.

The amines suitable for use in the present invention are, in general, water-insoluble and/or capable of forming desired water-insoluble salts. In general, amine compounds containing a terminal polar nitrogen containing group and at least 2 hydrophobic substituent groups, such as those compounds derived from fatty acids of varying molecular weights and different degrees of saturation, are suitable for use. The suitable amines may be secondary or tertiary amines.

In particular, secondary and tertiary aliphatic amines having two substituent groups, each containing about 7 to about 15 carbon atoms, and including branch chain structures as well as straight chain structures, are quite suitable for use in the present invention. Mixtures of amines are suitable when containing to a predominant extent the foregoing structures. It should be noted that for tertiary aliphatic amines the third substituent group may contain any number of carbon atoms but preferably should not contain over about 15 carbon atoms. Further, the OH, COOH, OCH$_3$, halogen, NO$_2$ and SO$_3$ substituted derivatives of the substituent groups may, in most cases, be used, as well as the substituent groups containing alkoxy radicals, as long as at least two of the groups are hydrophobic, thus rendering the compound water-insoluble to the desired degree. The primary aliphatic amines are less suitable because of their tendency to precipitate as the amine salts when in contact with wet phosphoric acid. The secondary or tertiary aliphatic amines containing less than about 7 carbon atoms on each of at least two substituent groups exhibit the undesirable tendency to be water-soluble. The secondary or tertiary aliphatic amines containing more than about 15 carbon atoms on each of at least two substituent groups exhibit the undesirable tendency to form salts which are relatively insoluble in the extractant phase. Aromatic amines, whether primary, secondary or tertiary, exhibit undesirable tendencies, such as either poor extractant properties, poor water-insoluble salt forming properties or poor salt solubilities in the extractant phase.

All of the immediately foregoing relating to the amines is, in general, applicable to the amine salts which are suitable for use in the instant invention. In addition, the amine salts suitable for use in the present invention can, in general, be formed from many organic and inorganic acids and preferably those acids which are stronger than phosphoric acid, i.e., having a K $\alpha$ greater than about $8 \times 10^{-3}$, such as sulfuric acid, hydrochloric acid and the like. Ionization constant of an acid (K $\alpha$) as used herein refers to the dissociation of an acidic electrolyte at room temperature, i.e., about 25°C., and is equal to the product of the activities of each of the ions produced by the dissociation (if more than one ion of a given kind is produced, its activity is raised to the corresponding power) divided by the activity of the undissociated molecules with the activities assumed to be in their standard states at infinite dilution.

The term "water-insoluble" as used herein with respect to the amines and/or amine salts does not necessarily require complete insolubility. It merely requires that the material be sufficiently immiscible with the phosphoric acid phase to allow physical separation of the liquids into two distinct phases.

Suitable amines useful as extractants are long chain hydrocarbyl amines represented by the formula

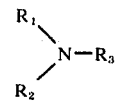

wherein R$_1$ and R$_2$ are saturated or ethylenically unsaturated aliphatic hydrocarbyl groups containing from about 7 to about 15 carbon atoms and R$_3$ is hydrogen or a saturated or ethylenically unsaturated aliphatic hydrocarbyl group containing from 1 to about 18 carbon atoms.

The preferred amine salts useful as extractants are long chain hydrocarbyl amine salts of the following formula

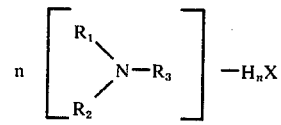

wherein R$_1$, R$_2$ and R$_3$ are as defined above, $n$ is an integer from 1 to 3 inclusive and X is an anion of a mineral acid having a K $\alpha$ greater than about $8 \times 10^{-3}$.

The following long chain hydrocarbyl amines are representative of suitable extractants for use in the present invention.

di-n-decylamine [CH$_3$(CH$_2$)$_9$]$_2$NH di-n-decylammonium sulfate 2[[CH$_3$(CH$_2$)$_9$]$_2$NH]·H$_2$SO$_4$ tri-n-octylamine [CH$_3$(CH$_3$)$_7$]$_3$N·HCl methyldioctylamine [CH$_3$(CH$_2$)$_7$]$_2$(CH$_3$)N di-n-dodecylamine [CH$_3$(CH$_2$)$_{11}$]$_2$NH tri-n-dodecylamine [CH$_3$(CH$_2$)$_{11}$]$_3$N tricaprylyl amine R$_3$N where R is a mixture of C$_8$H$_{17}$ and C$_{10}$H$_{21}$ but predominantly C$_8$H$_{17}$.

tricaprylyl amine sulfate 2(R$_3$N)·H$_2$SO$_4$ where R is a mixture of C$_8$H$_{17}$ and C$_{10}$H$_{21}$ but predominantly C$_8$H$_{17}$.

tri iso-octyl amine [CH$_3$(CH$_2$)$_7$]$_3$N where C$_8$H$_{17}$ groups are comprised of mixed isomers.

N,N-didodecenyl-N-m-butyl amine (C$_4$H$_9$) (C$_{12}$H$_{23}$)$_2$N

N-dodecenyl-N-trialkylmethyl amine (C$_{12}$H$_{23}$) (R$_1$R$_2$R$_3$C)NH where R$_1$ + R$_2$ + R$_3$ equal C$_{11}$H$_{23}$ to C$_{14}$H$_{29}$.

N-lauryl-N-trialkylmethyl amine (C$_{12}$H$_{26}$)(R$_1$R$_2$R+C)NH where $R_1 + R_2 + R_3$ equal $C_{11}H_{23}$ to $C_{14}H_{29}$.

tricoco amine $R_3N$ where R is a mixture of

|  | Percent |
|---|---|
| $C_8H_{17}$ to $C_{10}H_{21}$ | 15 |
| $C_{12}H_{25}$ | 48 |
| $C_{14}H_{29}$ | 18 |
| $C_{16}H_{33}$ | 9 |
| $C_{18}H_{37}$ (stearyl-oleyl) | 10 | tri lauryl amine $R_3N$ where R is a mixture of

|  | Percent |
|---|---|
| $C_{12}H_{26}$ | 88 |
| $C_{14}H_{29}$ isomers | 10 |
| $C_{10}H_{21}$ | 2 |

Particularly preferred amines are:

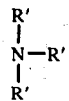

where R' is an alkyl group containing 8 or 9 carbon atoms.

The weight ratio of silane to amine in the mixture should be from 20 to 1 to 1 to 20. If lower amounts of amine are employed the extractivity of the mixture for fluorine compounds will be lower than desired whereas the employment of greater amounts of amine will tend to result in concomitant extraction of undesirably large amounts of phosphate values.

In the practice of the invention the silane and amine mixture is desirably dissolved in an organic diluent capable of dissolving such mixture and which is substantially water insoluble. A wide range of organic solvents are effective including kerosene, mineral spirits, naphtha, benzene, xylene, toluene, nitrobenzene, carbon tetrachloride, chloroform, trichloroethylene and the like. The amount of amine silane mixture dissolved in the solvent may be from about ½ percent to an amount sufficient to form a saturated solution.

The volume of extractant used for extracting a given volume of phosphoric acid is not critical and optimum ratios for particular extraction conditions can be determined by routine tests. In general, it is only necessary to use an amount of extractant sufficient to extract fluorine compounds from the phosphoric acid and to form a water immiscible extractant phase.

The extractant can be contacted with the phosphoric acid in accordance with conventional solvent extraction technique either in batch extraction operations or in continuous countercurrent extraction operations.

In general, the temperature of which the extraction is conducted is not critical but with some silanes, particularly those of high molecular weight, improved extraction is obtained at elevated temperatures in the range of 50° to 100°C. If the extraction is conducted at elevated temperatures, it may be desirable to conduct the extraction under reflux or elevated pressure to present undue material loss.

Following the extraction the extractant phase is allowed to separate and this phase containing the extracted fluorine compounds is separated from the phosphoric acid. The extractant can then be recovered by admixture with sufficient base to convert the fluorine compounds contained therein to water soluble salts and separating the organic extractant phase from the aqueous phase.

The practice of the invention is further illustrated by the following examples.

Example I

About 100 gms. 60% $H_3PO_4$ containing 1500 ppm fluoride (calculated as F) by weight is shaken for 10 minutes at 50°C. in a separatory funnel with 200 grams of a solution containing 2 gms. trialkylamine (about 60% $C_8$ alkyl groups; 30–35% $C_{10}$ alkyl groups; remainder $C_6$-$C_{12}$ alkyl groups) and 7.5 gms. triphenylsilanol dissolved in tetramethylbenzene. The organic phase is then separated and analysis of the $H_3PO_4$ layer shows the fluoride content to be reduced to about 200 ppm.

Washing the organic phase with 300 gms. NaOH solution having a pH of 8.4 effectively strips fluorides from the organic phase permitting its recycle to the extraction process.

For purposes of comparison, the procedure is repeated with an extractant containing no trialkylamine. No measurable reduction in fluoride level is obtained.

For further comparison the procedure is repeated with extractant containing amine but no silanol. The fluoride level is only reduced to 350 ppm.

Example II

The procedure of Example I is repeated except that 9 gms of

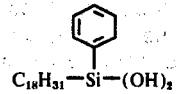

is substituted for the 7.5 gms of triphenylsilanol. Comparable results are obtained. (Fluoride level is reduced to about 250 ppm).

Example III

The procedure of Example I is repeated except that amine content of the extractant is reduced to 1 gm. and 7 gms of tributylsilanol are substituted for the 7.5 gms. triphenylsilanol. Comparable results are obtained. (Fluoride level is reduced to about 125 ppm).

Example IV

The procedure of Example III is repeated except that 2.5 gms. $(C_6H_{13})_3SiOH$ is substituted for the 7 gms. tributylsilanol. Comparable results are obtained. (Fluoride level is reduced to about 170 ppm).

What is claimed is:

1. A process for removing fluorine compounds from aqueous phosphoric acid containing the same, said process comprising (1) contacting said phosphoric acid with a water insoluble extractant comprising a mixture, dissolved in an organic diluent, of a silane represented by the formula

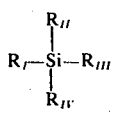

wherein from one to two of $R_I$, $R_{II}$, $R_{III}$ and $R_{IV}$ are selected from the group consisting of —OH, —Cl, and —OR, R being an alkyl group containing from 1 to 4 carbon atoms and the remaining $R_I$, $R_{II}$, $R_{III}$ and $R_{IV}$ are selected from the group consisting of alkyl, phenyl, and alkyl phenyl, said remaining $R_I$, $R_{II}$, $R_{III}$ and $R_{IV}$ containing a total of from 12 to 25 carbon atoms; and an amine compound selected from the group consisting of: a. long-chain hydrocarbyl amines represented by the formula

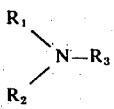

$R_1$ and $R_2$ each being selected from the group consisting of saturated and ethylenically unsaturated aliphatic hydrocarbyl groups containing from 7 to 15 carbon atoms and $R_3$ being selected from the group consisting of hydrogen and saturated and ethylenically unsaturated aliphatic hydrocarbyl groups containing from 1 to 18 carbon atoms; b. salts of said long-chain hydrocarbyl amines represented by the formula

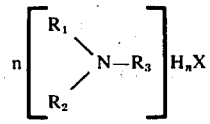

$n$ being an integer from 1 to 3 and X being an anion of a mineral acid having a K $\alpha$ greater than $8 \times 10^{-3}$; the weight ratio of said silane to said amine being from 20 to 1 to 1 to 20 and said extractant being used in sufficient amount to extract fluorine compounds from said phosphoric acid and to form a water-immiscible extractant phase, (2) separating said extractant containing extracted fluorine compounds from said phosphoric acid and (3) further contacting the separated extractant with an aqueous basic solution and removing fluorine compounds from said extractant.

2. The process of claim 1 wherein said silane is represented by the formula

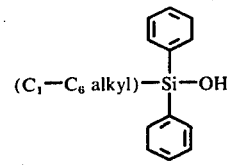

3. The process of claim 1 wherein said silane is represented by the formula

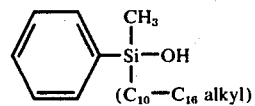

4. The process of claim 1 wherein said silane is represented by the formula

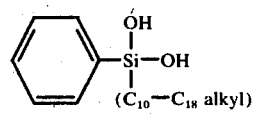

* * * * *